United States Patent
Hiebl

(10) Patent No.: US 8,975,585 B2
(45) Date of Patent: Mar. 10, 2015

(54) METHOD AND DEVICE FOR TRACKING A MOVING TARGET OBJECT

(71) Applicant: EADS Deutschland GmbH, Munich (DE)

(72) Inventor: Manfred Hiebl, Neuburg a. d. Donau (DE)

(73) Assignee: EADS Deutschland GmbH, Munich (DE)

( * ) Notice: Subject to any disclaimer, the term of this patent is extended or adjusted under 35 U.S.C. 154(b) by 243 days.

(21) Appl. No.: 13/682,349

(22) Filed: Nov. 20, 2012

(65) Prior Publication Data

US 2014/0061478 A1   Mar. 6, 2014

(30) Foreign Application Priority Data

Nov. 28, 2011 (DE) .......................... 10 2011 119 480

(51) Int. Cl.
| | | |
|---|---|---|
| *G01J 5/02* | (2006.01) | |
| *G01S 17/50* | (2006.01) | |
| *F41H 13/00* | (2006.01) | |
| *F42B 12/40* | (2006.01) | |
| *F41G 1/32* | (2006.01) | |
| *G01C 15/04* | (2006.01) | |

(52) U.S. Cl.
CPC ................ *G01S 17/50* (2013.01); *F41H 13/00* (2013.01); *F42B 12/40* (2013.01); *F41G 1/32* (2013.01); *G01C 15/04* (2013.01)
USPC ......................................................... 250/342

(58) Field of Classification Search
USPC ......................................................... 250/342
See application file for complete search history.

(56) References Cited

U.S. PATENT DOCUMENTS

| | | | |
|---|---|---|---|
| 3,563,711 A | | 2/1971 | Hammond et al. |
| 4,394,997 A | | 7/1983 | Maudal |
| 4,470,818 A | * | 9/1984 | Marshall .......................... 434/22 |
| 4,654,949 A | * | 4/1987 | Pryor .......................... 29/407.04 |
| 5,173,945 A | | 12/1992 | Pieters et al. |
| 5,195,752 A | * | 3/1993 | Reeves et al. .................. 273/374 |
| 2002/0030742 A1 | * | 3/2002 | Aman et al. .................. 348/169 |
| 2002/0036617 A1 | * | 3/2002 | Pryor .............................. 345/156 |

(Continued)

FOREIGN PATENT DOCUMENTS

| | | |
|---|---|---|
| DE | 690 11 831 T2 | 3/1995 |
| DE | 102 28 013 B4 | 11/2005 |

(Continued)

OTHER PUBLICATIONS

Goecke GmbH & Co. KG; Marking paint SOPPEC Reflect-Light, retroreflective ( marierfarbe SOPPEC Reflect-Light), retroreflektierend. 2009. online.

(Continued)

*Primary Examiner* — David J Makiya
*Assistant Examiner* — Taeho Jo
(74) *Attorney, Agent, or Firm* — Crowell & Moring LLP

(57) ABSTRACT

A method for tracking a moving target object, in particular a vehicle. The method involves identification the target object, marking the target object with a marking invisible in the visible spectrum but retro-reflective in a selected wavelength range of the invisible spectrum of light, tracking the marked moving target object with an image capture device provided on a moving platform, which image capture device is sensitive in the selected wavelength range of the invisible spectrum.

13 Claims, 2 Drawing Sheets

(56) References Cited

U.S. PATENT DOCUMENTS

| | | | |
|---|---|---|---|
| 2003/0201394 A1* | 10/2003 | Peoples | 250/336.1 |
| 2005/0018066 A1* | 1/2005 | Hofer | 348/333.02 |
| 2005/0115552 A1* | 6/2005 | Dobbins | 124/73 |
| 2005/0126553 A1* | 6/2005 | Rice | 124/31 |
| 2005/0172852 A1* | 8/2005 | Anderson et al. | 106/31.03 |
| 2005/0183569 A1* | 8/2005 | Solomon | 89/1.11 |
| 2006/0033713 A1* | 2/2006 | Pryor | 345/158 |
| 2008/0205700 A1* | 8/2008 | Nir | 382/103 |
| 2009/0081619 A1* | 3/2009 | Miasnik | 434/21 |
| 2012/0113406 A1 | 5/2012 | Bockem et al. | |

FOREIGN PATENT DOCUMENTS

| | | | | |
|---|---|---|---|---|
| GB | 2380883 A | * | 4/2003 | G01S 3/781 |
| WO | WO 2010/148525 A1 | | 12/2010 | |

OTHER PUBLICATIONS

SOPPEC; Safety Data Sheet (EC No. 1907/2006) Sicherheitsdatenblatt zu Reflect Light, 2009, Online.

Palma; Mission : Impossible, Paramount Pictures, 1996.

German-language Office Action dated Feb. 5, 2013 (nine (9) pages).

* cited by examiner

METHOD AND DEVICE FOR TRACKING A MOVING TARGET OBJECT

TECHNICAL FIELD

Exemplary embodiments of the present invention relate to a method and a device for tracking a moving target object, in particular a vehicle.

BACKGROUND OF THE INVENTION

With so-called asymmetrical threat situations, in which enemy persons disguise themselves as civilians and operate out of this civilian disguise, it is difficult to combat enemy persons from a distance unrecognized without thereby causing greater collateral damage.

The use of civilian motor vehicles by the enemy persons makes identification and combating enemy persons difficult. If these enemy persons are combated in a targeted manner from a close vicinity, for example, by means of firearms from one's own task forces, these task forces are exposed by the use of firearms and the consequences resulting therefrom. In particular in the case of operations in enemy territory, this type of direct combating of the enemy persons is therefore typically avoided.

It would be advantageous if the enemy persons could be combated by means of so-called drones, that is, unmanned missiles or aircraft. To this end it is necessary for the drone to clearly identify the vehicle in which the enemy person is traveling. However, this identification often cannot be clearly carried out by the drone, since other vehicles of the same model with the same exterior color may be traveling in the area in which the target person is located.

It is conceivable to carry out an automatic identification by image capture devices of the drone based on the vehicle license plate of the vehicle used by the target person, if this registration is known. However, the angle of incidence and angle of view of the drone is often not suitable for being able to reliably capture and recognize the vehicle license plate.

SUMMARY OF THE INVENTION

Exemplary embodiments of the present invention are directed to methods and devices that make it possible to locate and track and optionally also to combat moving target objects.

This method according to the invention for tracking a moving target object, in particular a vehicle, has the following steps:

a) Identification of the target object;

b) Marking the target object with a marking invisible in the visible spectrum but retro-reflective in a selected wavelength range of the invisible spectrum of light;

c) Tracking the marked moving target object with an image capture device provided on a moving platform, which image capture device is sensitive in the selected wavelength range of the invisible spectrum.

Advantages

Marking the target object, after it has been identified, with a marking invisible in the visible spectrum but retro-reflective in a selected wavelength range of the invisible spectrum of light, makes is possible to mark the moving target object such that the marking cannot be recognized with the naked eye, that is, is thin and transparent, for example, but at least is not noticed as a marking. The target person driving in the moving target object, for example in the vehicle, thus does not notice the operation of marking or is not aware of sitting in a marked vehicle and therefore does not recognize the potential threat that is associated with the marking of the moving target object. The marked moving target object is then tracked with an image capture device provided on a moving platform, which image capture device is sensitive in the selected wavelength range of the invisible spectrum. This tracking can be carried out from a distance, for example, in an air-based manner, so that the target person does not notice this tracking.

Preferably, the selected wavelength range lies in the infrared spectrum. Natural illumination sources, such as the sun or the moon, can thus be used so that the image capture device provided on the moving platform operates purely passively and is not exposed by emitting illumination of its own.

Preferably, the marking is formed by a marking paint invisible, for example transparent in the visible spectrum, but retro-reflective in the selected invisible wavelength range, which marking paint has a paint and retro-reflective particles embodied therein, wherein the particles in the selected wavelength range of the invisible spectrum of light have a refractive index sufficient for a retro-reflection and wherein the particles embedded in the paint are translucent in the visible spectrum of light. A marking paint of this type can be applied quickly and easily and cannot be detected in the dried condition. This marking paint is preferably low-viscosity and quick drying so that it can be distributed over a large area within a short time and quickly forms a clear lacquer-like transparent thin film that dries quickly. This marking is thereafter hardly perceptible or no longer perceptible with the naked eye, that is, is invisible at least when observed superficially.

Advantageously, the retro-reflective particles have the same refractive index as the paint in the visible spectrum of light, so that the marking paint is transparent in this spectrum.

The marking paint is furthermore preferably poorly water-soluble or not water-soluble and adheres strongly to the substrate and thus cannot be removed without great effort. Accordingly, the paint cannot be simply washed off by rain.

It is particularly advantageous if the marking paint is applied to the target object from a distance. This is carried out preferably by means of a paintball shooting device. This marking according to the invention of the moving target object to be combated can thus be carried out by one's own disguised task forces, which takes place by means of a paintball shot unnoticed from nearby, which paintball is filled with the retro-reflection paint visible only in the infrared spectrum and bursts upon impact on the target object to be marked. Even if the target person notices the impact of the paintball, which is unlikely, for example, with a vehicle engine running, he will not classify this impact as a preliminary stage of a potential threat, since nothing further happens immediately after the impact of the paintball.

It is particularly advantageous if the moving platform for tracking the marked target object is embodied as an aircraft, preferably a drone, which in particular is embodied as a helicopter or a wing aircraft. This observation and tracking of the target object from the air can be carried out from a greater distance, so that the target person in the target object does not directly notice that he is being tracked. In particular, when the aircraft forming the platform is a miniature aircraft the size of a model aircraft, the likelihood that the target person will notice the tracking is clearly reduced.

It is particularly advantageous if the moving platform for tracking the marked target object is provided with a position-determining device and if from one's own position determined by this position-determining device and the angle of view to the marked object, a determination of the position data of the marked target object is carried out.

It is advantageous thereby if the data of the current position of the platform and of the viewing angle to the target object necessary for determining the position data of the marked target object or the position data of the marked target already determined on board the platform object are transmitted via a preferably wireless data transmission connection to a primary station or to a combat device for the marked target object. This variant of the method according to the invention makes it possible to use an extremely small platform for tracking the marked target object, for example, a miniature aircraft of the already mentioned size of a model aircraft. The combat device for the marked target object can in this manner be supplied with the necessary data for locating the moving target object to be combated and the combat can then take place, for example, at a location at which the collateral damage to be expected is minimized.

Alternatively, the moving platform itself can be provided with a combat device for the marked target object so that a combat of the enemy target object can be carried out free from delays.

It is particularly advantageous if with the method according to the invention the platform with the image capture device is positioned between a natural source of illumination, for example, the sun or the moon, and the marked target object. The sunlight or moonlight reflected by the retro-reflecting marking thereby strikes the image capture device of the platform. This utilization of the natural sunlight or moonlight for illuminating the target object makes it possible to design the image capture device of the platform purely passively so that it does not need to emit an illuminating beam of its own by which it could be detected itself.

The invention is further directed at a device for tracking a moving target object, which is designed for carrying out the method according to the invention. The device to this end is equipped with an image capture device provided on a moving platform, which image capture device is sensitive in a wavelength range of the invisible spectrum and is sensitized to the spectrum of the light retro-reflected by the marking.

A marking paint is also covered by the invention, which has a paint and retro-reflecting particles embedded therein, wherein the particles have a refractive index sufficient for the retro-reflection in a selected wavelength range of the invisible spectrum of light and wherein the paint and the particles embedded therein are translucent in the visible spectrum of the light.

Preferred exemplary embodiments of the invention with additional design details and further advantages are described and explained in greater detail below with reference to the attached drawings.

BRIEF DESCRIPTION OF THE DRAWINGS

They show.

DESCRIPTION OF PREFERRED EXEMPLARY EMBODIMENTS

Figure 1:
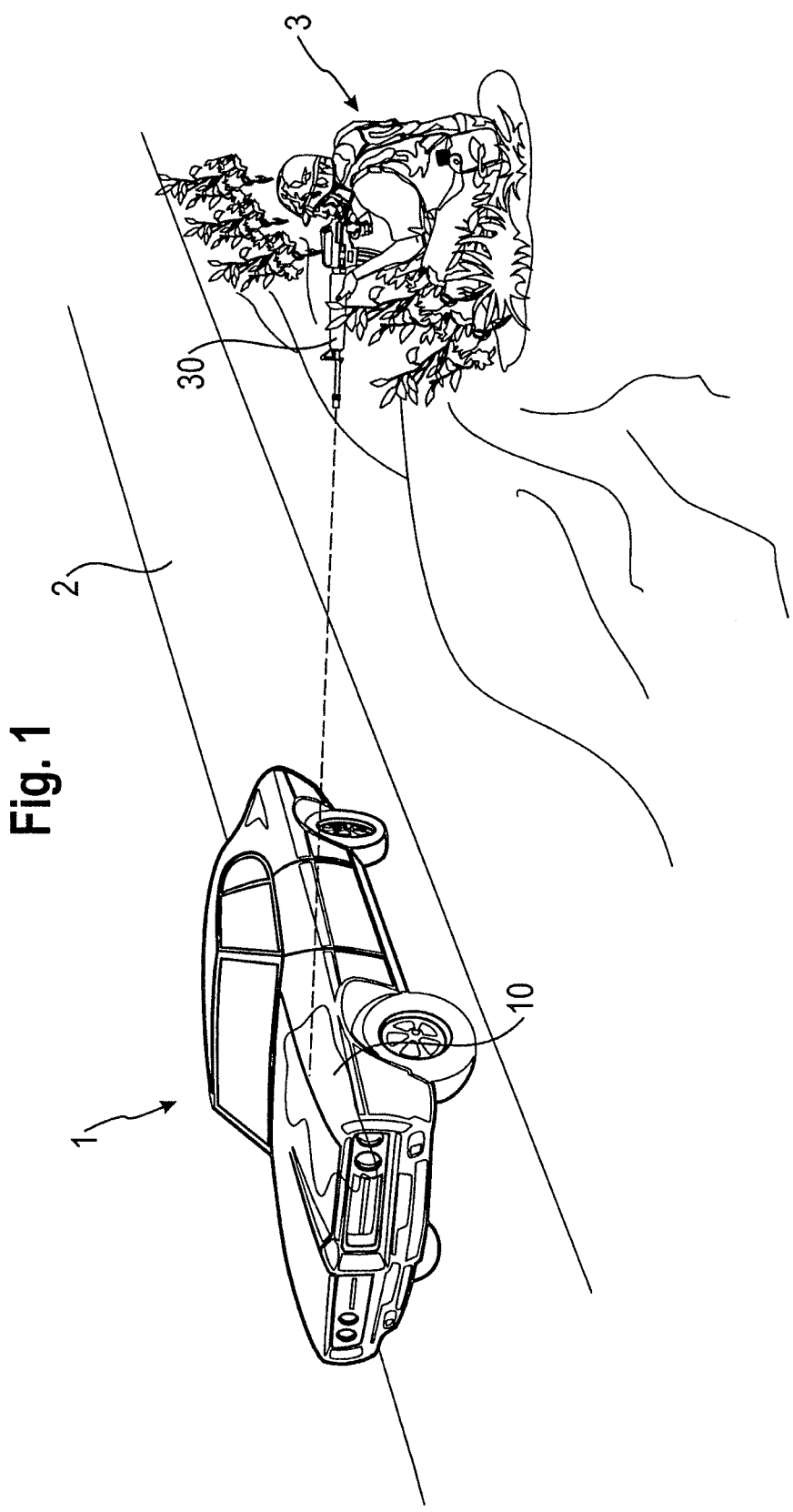
FIG. 1 a scenario of the application of the marking onto a moving target object according to step b) of the present invention and
FIG. 2 the tracking of a marked target object according to step c) of the method according to the invention.

FIG. 1 shows diagrammatically a scenario of the marking of a moving target object. The moving target object is here formed by a motor vehicle 1, which is driving along a street 2.

The target object is first identified in order to establish whether the target person to be tracked is driving in the motor vehicle. This identification of the target object is carried out by task forces not shown in the figure, and when identification has been made, a target pickup of the target object 1 is transmitted to a camouflaged marksman 3 operating in hiding.

Figure 2:
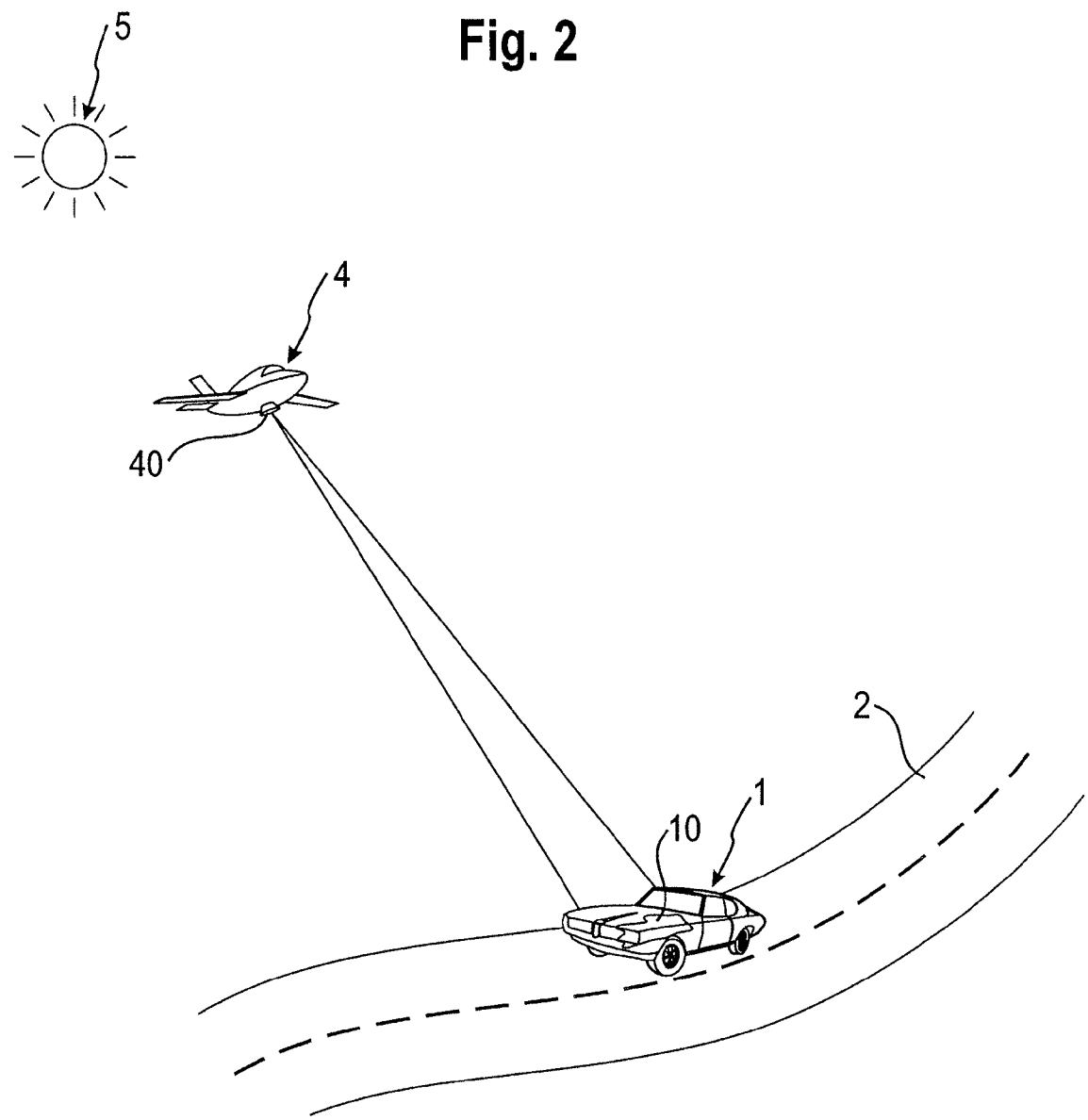

The marksman 3 is equipped with a shooting device 30 for paintballs. These paintballs are composed, for example, of a gelatin casing that surrounds a paint supply. The marking paint used in the method according to the invention, as is shown in FIGS. 1 and 2, is an invisible paint, which has retro-reflective properties in the infrared wavelength range.

The marking paint has retro-reflecting particles, which are embedded in a paint material and are encased thereby. The paint material and the material of the retro-reflecting particles and the outer design thereof are coordinated with one another such that the marking paint is transparent in the visible spectrum of the light, that is, translucent and does not absorb any colors of the visible spectrum. This complete transmission in the visible spectrum means that the marking paint does not reflect any part of the visible spectrum of light. In a selected wavelength range of invisible light, for example in the infrared range, the particles have a retro-reflecting property, however. To this end, the refractive indices of the paint and of the material of the particles in the selected wavelength range of invisible light are different so that reflections and thus the desired retro-reflecting effect occur at the transition, that is at the boundary layer, between the particle material and the paint. In contrast thereto, the refractive indices of the paint and the material of the particles in the visible range of the light are the same so that no reflection occurs here at the boundary between the particle material and the paint.

If possible, the marksman 3 fires at the vehicle 1 identified as the target object in the region of a surface pointing upwards, such as the hood, for example, the roof or the trunk lid, with one or more paintballs with this marking paint in order thus to apply the invisible paint retro-reflecting in the IR wavelength range as a marking 10 onto the body of the vehicle 1.

The occupants of the vehicle possibly do not notice the impact of the paintball on the body at all due to the ambient noise or they at least do not classify it as a dangerous situation or as a preliminary stage to a dangerous situation.

In the further course of carrying out the method according to the invention, the vehicle 1 provided with the retro-reflecting marking 10 is detected by an image capture device 40 on board a moving platform, in the example shown, a reconnaissance drone 4, and identified based on the marking 10. The reconnaissance drone 4 is thereby located in a position between the vehicle 1 and the sun 5 essentially on or slightly next to the straight line that describes the sunlight falling on the vehicle 1. The image capture device 40 can thus capture the sunlight retro-reflected by the marking 10.

Based on the position data of the drone 4 determined by a conventional position determination device of the drone 4, an onboard computer provided on board the drone 4 can determine, with the likewise known viewing direction vector of the image capture device 40 to the target object as well as an estimated or measured distance to the target object, the position data of the vehicle 1 forming the target object and transmit them via a data link connection to a combat station (not shown), for example, another drone or ground troops. Alternatively, the drone 4 can be equipped with a corresponding combat device, for example, with rockets in order to combat the identified target object directly.

Although in the example shown and described above the application of the invisible marking 10 retro-reflecting in the IR range was shown by means of a paintball shooting device, the marking 10 can also be applied to the target object in a different manner. For example, a paint bomb can be thrown onto the target object from a camouflaged unmanned aircraft. However, the target object can also be marked in an unobserved moment by special forces by means of a spray paint that has the invisible retro-reflecting property.

The retro-reflecting property of the invisible marking 10 is not limited to the infrared wavelength range; the marking 10 can also be retro-reflecting in a different invisible wavelength range, such as the wavelength range of ultraviolet light. Accordingly, the wavelength properties of the image capture device 40 are then also adapted to this wavelength range. Furthermore, the platform formed by the drone 4 in the example can also be provided with an active illumination (not shown) that emits light in an invisible wavelength range that is reflected by the retro-reflecting marking 10. In this case it is not necessary to place the platform embodied in the example as a drone 4 between a natural light source, such as the sun 5, and the target object formed by the motor vehicle 1 in the example. However, the use of the natural light of the sun 5 described in the example has the advantage that the platform formed by the drone 4 does not reveal itself to the target person in the target object by emitting its own (visible or invisible) illumination.

One component of the invisible retro-reflecting paint used as marking 10 in the exemplary embodiment described can be perylene, for example, (an organic molecule of four benzene rings).

Reference numbers in the claims, the specification and the drawings are used only to better understand the invention and should not limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Vehicle
2 Street
3 Marksman
4 Drone
5 Sun
10 Retro-reflecting marking
30 Shooting device
40 Image capture device

What is claimed is:

1. A method for tracking a moving target object, comprising the steps:
   a) identifying the target object;
   b) marking the target object with a marking invisible in a visible spectrum but retro-reflective in a selected wavelength range of invisible spectrum of light;
   c) tracking the marked moving target object with an image capture device provided on an aircraft carrying a rocket, wherein the image capture device is sensitive in the selected wavelength range of the invisible spectrum;
   d) deploying the rocket towards the marked moving target object, wherein
   the marking is formed by an invisible marking paint that is retro-reflective in the selected invisible wavelength range, the marking paint has a paint and retro-reflective particles embodied therein, wherein the particles in the selected wavelength range of the invisible spectrum of light have a refractive index sufficient for a retro-reflection,
   the paint and the particles embedded therein are translucent in the visible spectrum of light,
   the retro-reflective particles have a same refractive index as the paint in the visible spectrum of light, so that the marking paint is transparent in this spectrum,
   the marking paint is applied to the target object from a distance, wherein the application of the marking paint is carried out by a paintball shooting device, and
   the aircraft and the paintball shooting device are arranged in different locations.

2. The method according to claim 1, wherein the selected wavelength range is in an infrared spectrum.

3. The method of claim 1, wherein the aircraft is a helicopter or a wing aircraft.

4. The method according to claim 1, wherein
   the aircraft includes a position-determining device, and
   a determination of a position data of the marked target object is performed based on a position determined using the position-determining device and an angle of view to the marked target object.

5. The method according to claim 1, wherein the aircraft is positioned between a natural source of illumination and the marked target object.

6. The method of claim 5, wherein the natural source of illumination is a sun or moon.

7. A method for tracking a moving target object, comprising the steps:
   a) identifying the target object;
   b) marking the target object using a marking paint that is shot from a paintball shooting device located at a distance from the target object, wherein the marking paint is invisible in a visible spectrum but retro-reflective in a selected wavelength range of invisible spectrum of light;
   c) tracking the marked moving target object with an image capture device provided on an aircraft carrying a rocket, wherein the image capture device is sensitive in the selected wavelength range of the invisible spectrum; and
   d) deploying the rocket towards the marked moving target object,
   wherein the aircraft and the paintball shooting device are arranged in different locations.

8. The method according to claim 7, wherein the marking paint includes paint and particles embedded in the paint, wherein the paint and particles have different refractive indices in the selected wavelength and the paint and particles have a same refractive index in the visible spectrum.

9. The method according to claim 7, wherein the selected wavelength range is in an infrared spectrum.

10. The method of claim 7, wherein the aircraft is a helicopter or a wing aircraft.

11. The method according to claim 7, wherein
    the aircraft includes a position-determining device, and
    a determination of a position data of the marked target object is performed based on a position determined using the position-determining device and an angle of view to the marked target object.

12. The method according to claim 7, wherein the tracking of the marked moving target is performed by the aircraft without emitting illumination by the aircraft.

13. A method for tracking a moving target object, comprising the steps:
    a) identifying the target object;
    b) marking the target object using a marking paint that is shot from a paintball shooting device located at a distance from the target object, wherein the marking paint is invisible in a visible spectrum but retro-reflective in a selected wavelength range of invisible spectrum of light;
c) tracking the marked moving target object with an image capture device provided on an aircraft, wherein the image capture device is sensitive in the selected wavelength range of the invisible spectrum; and
d) determining the position of the marked target object;
e) transmitting the position of the marked target object to a further aircraft carrying a rocket; and
f) deploying the rocket towards the marked moving target object, wherein the aircraft, the further aircraft and the paintball shooting device are arranged in different locations.

\* \* \* \* \*